April 19, 1955

H. H. RUDD 2,706,744

ENCLOSED ELECTRICAL BUS SYSTEMS

Filed Jan. 14, 1950

6 Sheets-Sheet 1

Inventor:

Harold H. Rudd,

By Ostrolenk & Faber

ATTORNEYS

April 19, 1955

H. H. RUDD 2,706,744

ENCLOSED ELECTRICAL BUS SYSTEMS

Filed Jan. 14, 1950

6 Sheets-Sheet 2

Inventor:

Harold H. Rudd,

Ostrolenk & Faber

ATTORNEYS

ENCLOSED ELECTRICAL BUS SYSTEMS

Filed Jan. 14, 1950

Inventor;

Harold H. Rudd,

By

Ostrolenk & Faber

ATTORNEYS

Inventor:
Harold H. Rudd.
By Ostrolenk & Faber
ATTORNEYS

Inventor:
Harold H. Rudd,
by
Ostrolenk & Faber
ATTORNEYS

INVENTOR.
Harold H. Rudd
BY
Ostrolenk & Faber
ATTORNEYS

United States Patent Office 2,706,744

Patented Apr. 19, 1955

2,706,744

ENCLOSED ELECTRICAL BUS SYSTEMS

Harold H. Rudd, Greensburg, Pa., assignor, by mesne assignments, to I-T-E Circuit Breaker Company, Philadelphia, Pa., a corporation of Pennsylvania Application January 14, 1950, Serial No. 138,545

6 Claims. (Cl. 174—99)

This invention relates to electrical bus systems and more particularly to bus systems in which each bus or conductor is separately enclosed in a duct or housing.

I have described in my prior Patent No. 2,275,203, issued March 3, 1942, a bus system in which each bus and its housing are supported by annular insulator frames which each carry a plurality of radially disposed insulators and which have annular flanges for supporting complementary semi-cylindrical plates which form the bus duct. This prior bus construction has been used to a considerable extent on electrical distribution systems of high current rating and has proved to be most satisfactory. Use of the prior construction on distribution systems of low current ratings has been limited as the cost of manufacture did not decrease materially with reductions in the current rating. For example, the cost of a distribution system of 600 amperes rating may be be as much as 90% of the cost of a similar bus system for a current rating of 2000 amperes.

The present invention relates to enclosed bus systems of the general type disclosed in the prior patent, and which are of simpler and less expensive construction for use where the maximum mechanical protection against damage from high short circuit stresses is not essential.

Objects of the present invention are to provide enclosed bus systems which may be constructed for various current ratings and which afford substantial economies in manufacturing and installation costs in the lower ranges of current ratings. Objects are to provide enclosed bus systems in which each bus or conductor is supported at spaced points by single insulators, and in which the enclosing duct is formed by tubular members which extend between adjacent pairs of diametrically split rings which are secured to the insulator supports. An object is to provide a bus system in which a series of single insulators support the bus or conductor, a lower half-ring of sheet metal is located at each insulator to form seats for tubular housing members, and complementary half-rings are secured to the lower half-rings to clamp the tubular housing members in place.

Other objects of the invention are to provide novel clamping devices on supporting insulators for securing a conductor rigidly thereto or, alternatively, to support the conductor for sliding movement with respect to the insulator.

A further object is to provide bus constructions in which joints of the bus are located at points where the conductor is supported on insulators.

These and other objects and the advantages of the invention will be apparent from the following specification when taken with the accompanying drawings in which.

Figures 21, 22, 23:
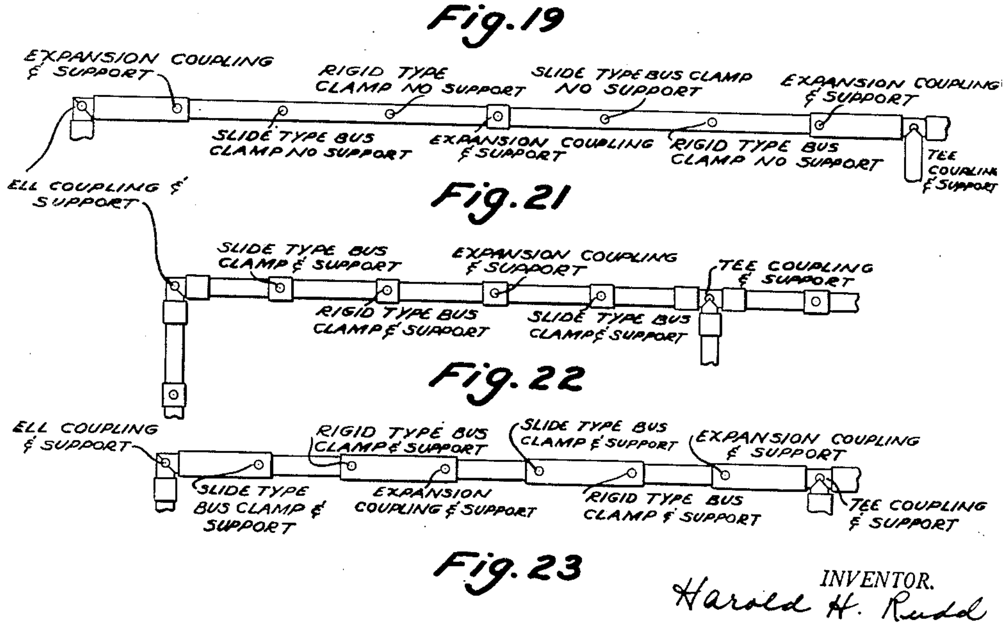

Figures 21, 22, and 23 are schematic views showing the manner in which the various clamps and couplings may be used in a bus run.

In the drawings, the reference numeral 1 identifies the buses which are each supported by a series of insulators 2 installed in longitudinally spaced relation on inverted channel supports or brackets 3 by mounting bolts 4. At each insulator 2, a half-ring or semi-cylindrical plate 5 is arranged between the insulator and its support 3, the plate having a flat section which is clamped between insulator base and the support 3.

Figure 1:
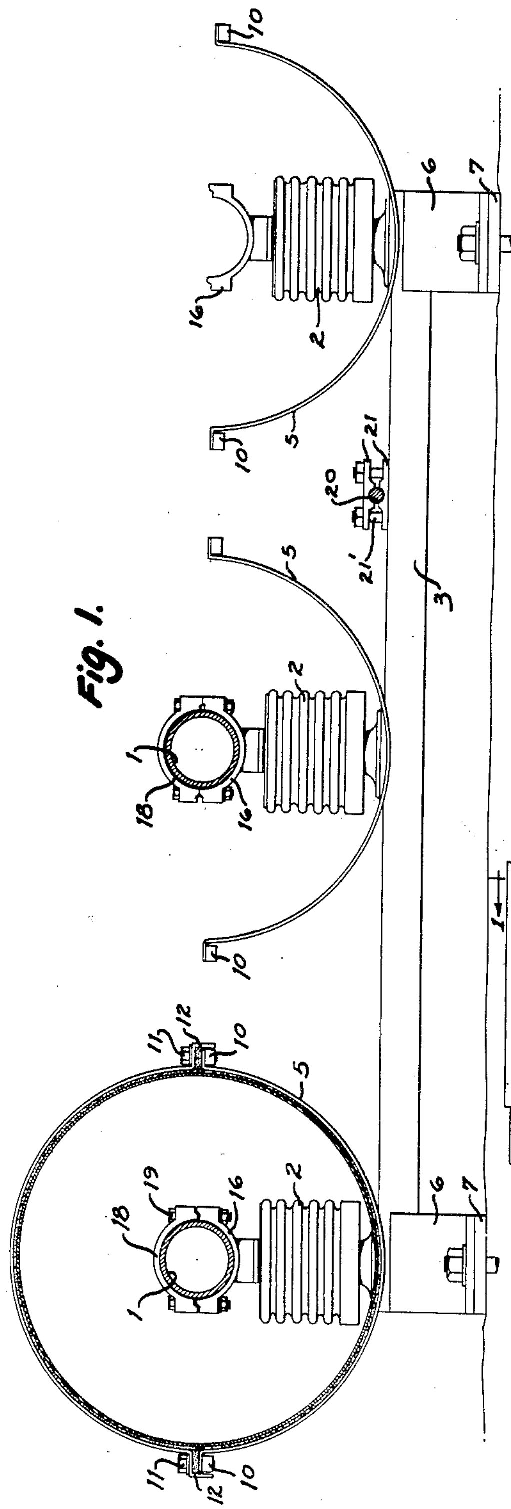
Figure 1 is a transverse section through a three-phase bus system embodying the invention but showing the conductors of only two phases, and the tubular housing of only one phase, the section through the housing and conductor being taken on line 1—1 of Figure 2.
Figure 2:
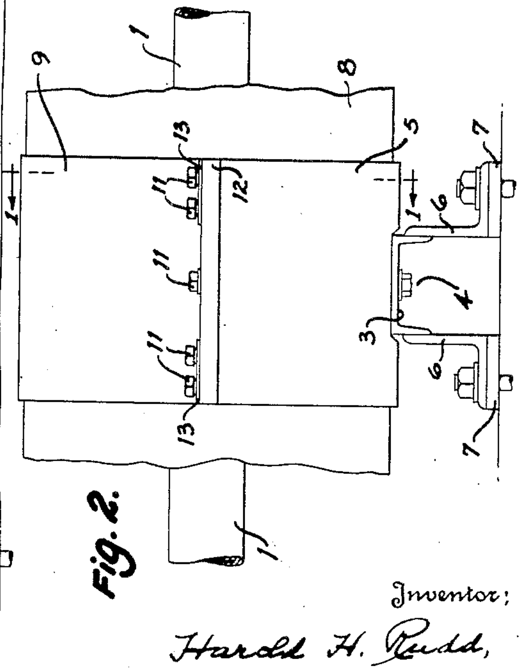
Figure 2 is a fragmentary side elevation of an enclosed bus at an insulator support thereof.

A single channel 3 is shown in Figure 1 as the support for a set of insulators 2 of a three phase bus system but it is to be understood that individual channels or equivalent supports are to be provided at points in the bus system, due to a change in direction or for other reasons, it is not convenient or practical to locate a set of insulators in a plane transverse to the conductors 1. Angles 6 are welded to the channel 3 for mounting the same upon a rigid support, which may be a concrete floor or wall, or a skeleton steel framework, and shims 7 of appropriate selected thickness may be used between the angles 6 and the supporting structure to obtain the desired linear disposition of the conductors 1.

Pre-formed tubular housings or duct sections 8 are threaded over the sections of the bus 1 as they are installed on the insulators 2, and these duct sections extend between and are clamped to adjacent rigidly supported half-rings 5 by removable half-rings or cover plates 9 of semi-cylindrical form. The half-rings 5 and 9 are of non-magnetic metal and, as presently preferred, are of sheet aluminum of from ⅛ to $\frac{3}{16}$ inch in thickness but may be of other metals or alloys and of other thicknesses according to design requirements for any particular installation.

Figures 5, 6, 7, 8, 9:
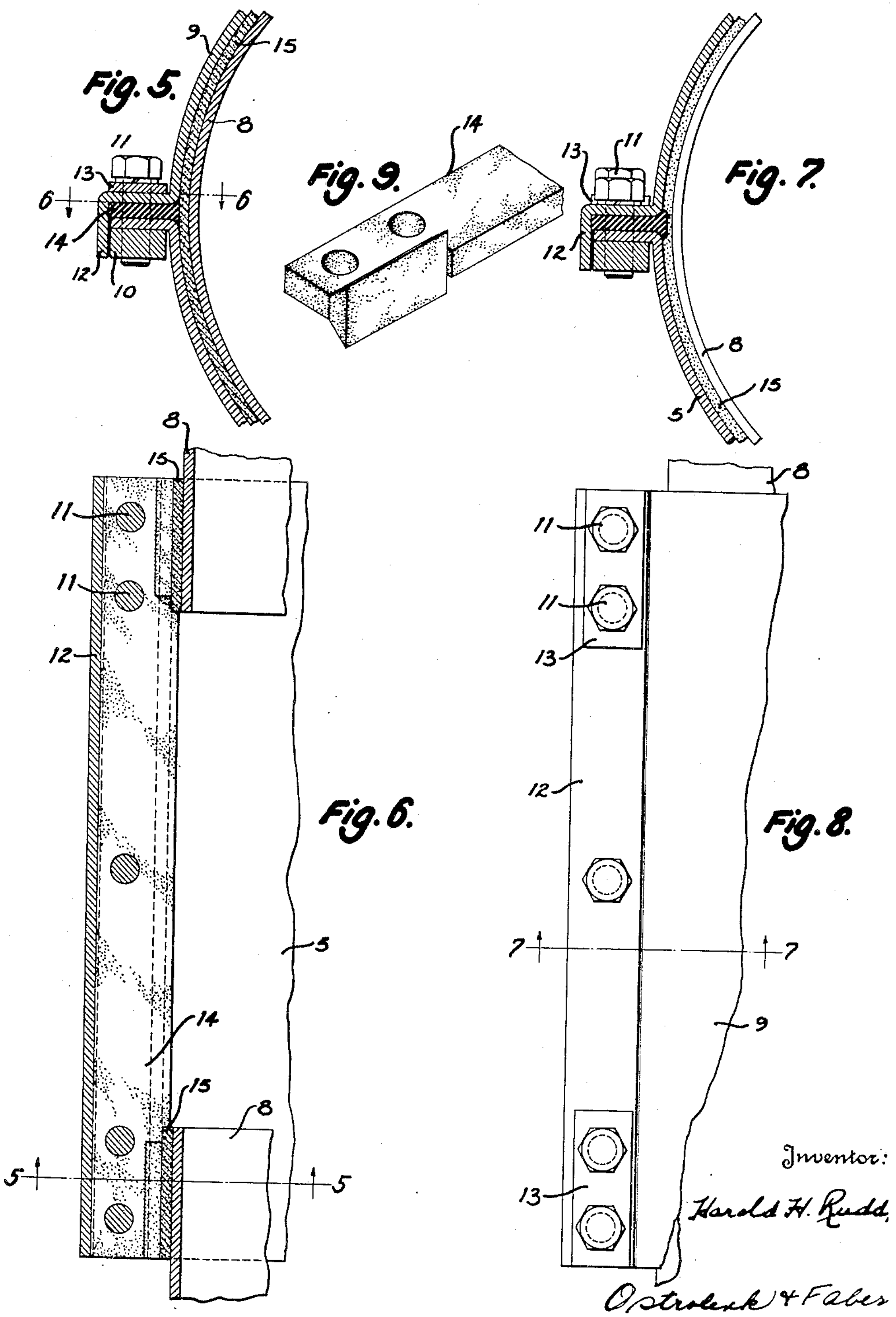
Figure 5 is a fragmentary transverse section, as taken on section line 5—5 of Figure 6, through a tubular bus housing or duct, and the half-rings which support the same.
Figure 6 is a fragmentary horizontal section, on the same enlarged scale, and as seen on the plane of section line 6—6 of Figure 5, of adjacent tubular duct sections and the supporting half-rings.
Figure 7 is a fragmentary transverse section through the bus housing on a plane, as indicated by line 7—7 of Figure 8, between the ends of adjacent duct sections.
Figure 8 is a fragmentary plan view of a bus housing as seen from above in Figures 5 and 7.
Figure 9 is a fragmentary perspective view of a sealing gasket which is clamped between the flanges of the half-rings which support the tubular duct sections.

Reinforcing strips 10 are preferably welded to flanges of fixed semi-cylindrical plates or half-rings 5 and are bored and tapped to receive clamping bolts 11 which extend through the mating flanges 12 of the cover plates 3. The edges of flanges 12 are turned down and short metal strips 13 are provided at the end sections of flanges 12 for stiffness to obtain a substantially uniform clamping pressure along the wedge-shaped ends of gaskets 14 which are cemented to the ends of the flanges 12 to seat upon gaskets 15 cemented to the ends of the duct sections 8, note Figures 5 and 6.

The conductors 1 may be of any desired cross-section but, as illustrated, are preferably copper tubes of circular cross-section, and made in sections of such length as to span a plurality of supporting insulators 2. The joints or connections between adjacent conductor sections are preferably made at an insulator or support point, and each section of a conductor 1 is rigidly supported at one insulator and is slidably supported at the other insulator or insulators upon which it is mounted.

Figure 3:
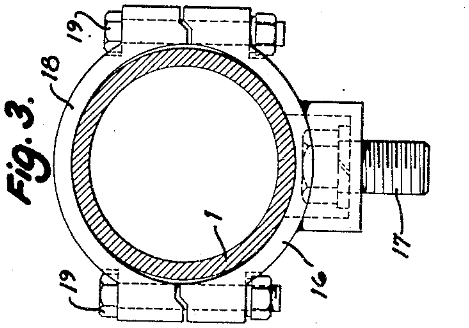
Figures 3 and 4 are fragmentary transverse sections, on a larger scale, of conductors and associated clamps for a rigid or a sliding support, respectively, of the conductors.
Figure 4:
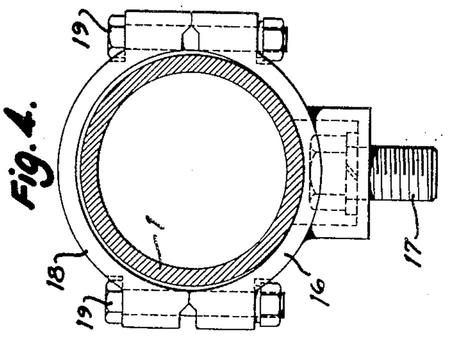

As illustrated in Figures 1, 3, and 4, the insulators 2 at intermediate points along a bus or conductor 1 each have a semi-cylindrical clamping sleeve 16 secured thereto by a threaded stud 17. The side edges of the sleeves 16 are stepped, but non-symmetrically with respect to a vertical plane through the axis of the sleeve, i. e., the right edge of each side of sleeve 16 is high, as viewed in Figures 1, 3 and 4, and the left edge is low.

The cooperating semi-cylindrical clamping sleeves 18 are similarly non-symmetrical, and the effective internal diameter of an assembled sleeve clamp depends upon the relative positioning of the upper sleeve 18 with respect to the lower and fixed clamping sleeve 16. The sleeves may be mated, as illustrated in Figure 3, to aline the high portions of one sleeve with the low portions of the other sleeve, whereby the conductor 1 is rigidly clamped to the insulator when the sleeve 18 is drawn down on the sleeve 16 by clamp bolts 19.

Alternatively, as illustrated in Figure 4, the upper sleeve 18 may be reversed to aline the high portions of the sleeves with each other, thereby preventing movement of the cover sleeve 18 into contact with the conductor 1, thus providing a sliding support for the conductor 1.

The low-resistance ground return for the bus system is provided by a bare copper conductor 20, of one or more strands, which is secured to the support 3 by clamp members 21, 21 and bolts 21'.

The ends 1' of sections of tubular conductors 1 are preferably stamped or pressed to a square cross-section (note Figures 10 to 13) and low-resistance electrical connections are made between adjacent conductor sections by copper bars or jumpers 22 which are laminated and relatively flexible at expansion or slidable connections between adjacent conductor ends.

Figure 10:
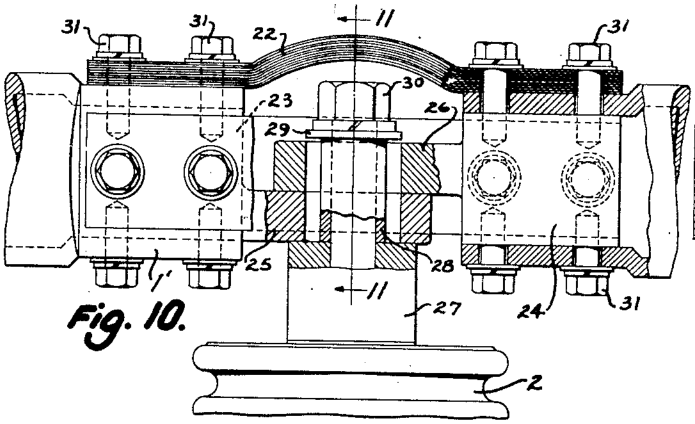
Figure 10 is a fragmentary side elevation with parts in section of an expansion connection and slidable support for the adjacent ends of tubular bus sections.
Figure 11:
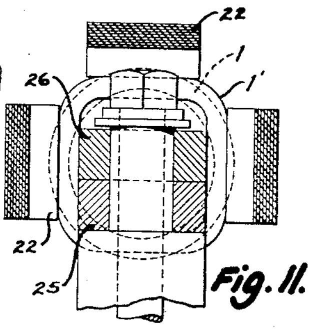
Figure 11 is a transverse section of the same taken on section line 11—11 of Figure 10.

As shown in Figures 10 and 11, a mechanical sliding support for the ends of bus sections 1, 1 is afforded by plugs 23, 24 which are fitted into the ends of the conductors and have slotted extensions 25, 26, respectively, supported upon the cylindrical metal bushing 27 on the insulator 2. A spacing sleeve 28 rests upon the bushing 27 to provide a seat for washer 29 to prevent engagement of the same with the plug extension 26 when the securing bolt 30 is passed through bushing 27 and threaded into the insulator 3. The plugs 23 and 24 are anchored within the squared ends 1' of the tubular conductors 1 by the studs or bolts 31, some of which also secure the electrical connectors 22 to the conductors.

When the spacing sleeve is omitted, the slotted extensions 25, 26 of plugs 23, 24 are rigidly clamped to each other and to the insulator 2. The electrical connectors may be short copper bars for this type of rigid mounting of the adjacent ends of conductor sections or, for uniformity in the construction of the conductor connections and to facilitate the assembly in the event of dimensional variations in commercial manufacture, the illustrated laminated type of jumpers may be employed at both the flexible and the rigid conductor couplings.

It is preferable, as illustrated, to employ three jumpers 22 to obtain a maximum surface area for cooling the electrical connection, and the total cross-section of the jumpers is adequate to carry the rated load without undue heating, i. e., the mechanical supporting elements 23—26 are not relied on to carry current at either the fixed or the expansion joints.

Figure 12:
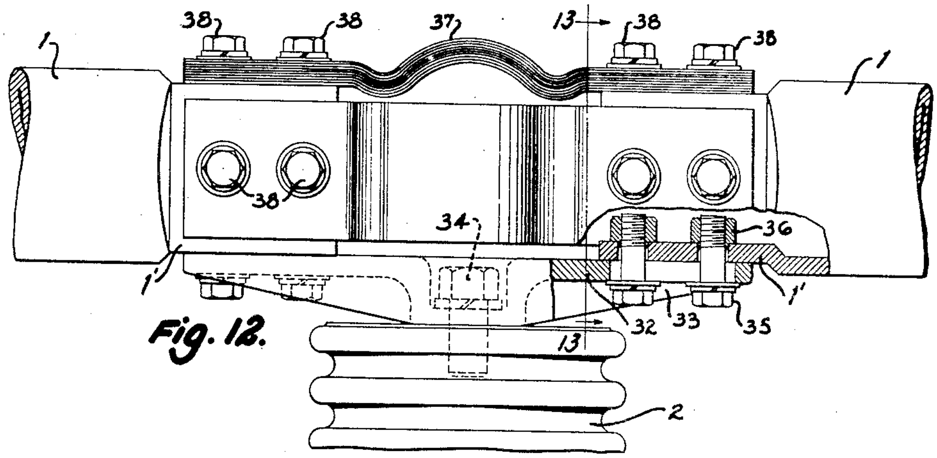
Figure 12 is a fragmentary side elevation, with parts in section, of another form of connection and support for bus sections.
Figure 13:
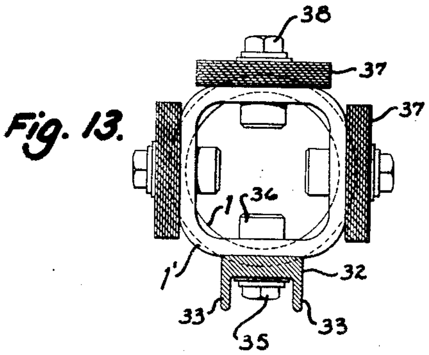
Figure 13 is a transverse section of the same on line 13—13 of Figure 12.

Another construction for either fixed or expansion joints, as illustrated in Figures 12 and 13, comprises a bar or shelf 32 of shallow T-form and with reinforcing side flanges 33 which is secured to an insulator 2 by a stud 34. Bolts 35 are passed through slots in the ends of the shelf 32 to clamp the flattened ends 1' of tubular conductors 1 to the shelf. The nuts 36, into which studs 35 are threaded, have small milled or otherwise roughened bosses which engage the inner edges of the bolt openings of the conductor ends 1' to anchor the nuts against rotation when the bolts are threaded into the nuts.

Conductive jumpers 37, preferably laminated for flexibility, are secured to adjacent conductor ends 1' by studs 38. As illustrated, the conductor ends 1' are rigidly clamped to the supporting bar 32 by the bolts 35 but it is to be understood that spacing sleeves, similar to spacing sleeves 28 of Figures 10 and 11, may be arranged on the bolts 35 when one or both of the conductor ends are to be slidably supported upon the bar 32.

The dimensions of the conductors and the spacings of the supporting insulators depend upon the normal current rating and the short circuit stress of a particular installation, and dimensional relations for each bus system could be so selected as to afford the theoretically maximum efficiency, as measured by the total weight and bulk, of the components which satisfy standard electrical and mechanical design requirements.

It is presently preferred, however, to manufacture commercially a limited number of "standard" dimensions such as, for example, insulator spacings of either 8 feet or 6 feet according to short circuit ratings of the particular bus systems; and tubular copper conductors of a maximum length of 24 feet, and of outside wall diameters varying in steps from about 1¼ inches to 3½ inches, and of two or three different wall thicknesses according to the particular requirements for mechanical strength and current carrying capacity.

It is to be understood that the invitation is not limited to these particular values and that they are specified only as being typical of appropriate dimensions for bus systems of current ratings of from 600 to 2500 amperes and short circuit ratings of up to 30,000 amperes.

The shape and the length of individual conductor and housing components may be varied from the "standard" linear components of straight runs of the bus system according to the electrical connections to be established and the relative locations of the generators, switch gear and other elements which are to be connected.

Figure 14:
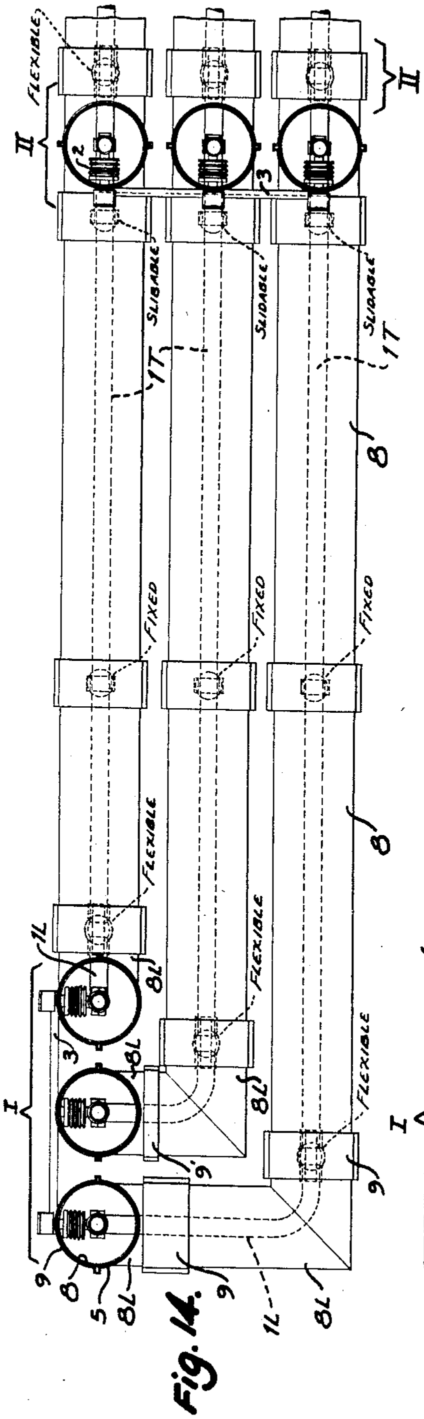
Figures 14 and 15 are fragmentary horizontal sections and side elevations, respectively, of a typical three-phase bus system embodying the invention.
Figure 15:
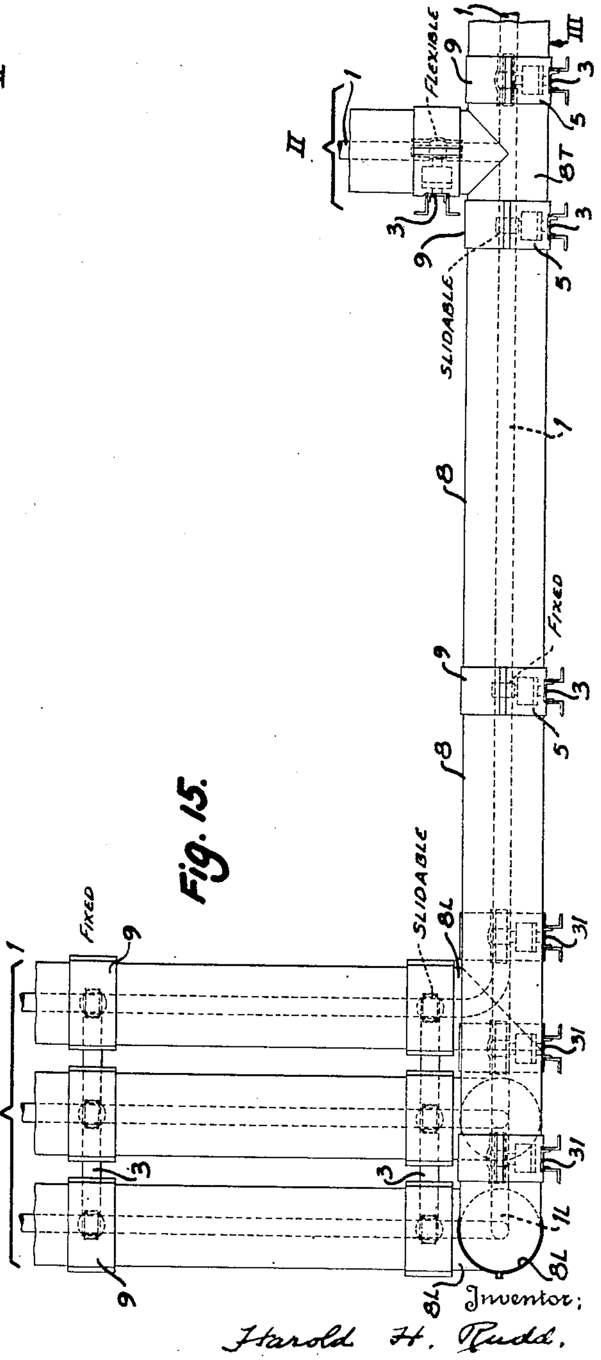

A typical portion of a bus system, as illustrated in Figures 14 and 15, may connect two three-phase buses I and II in parallel to a common input or output bus system III. So far as is practical, the insulators 2 for supporting the several buses are arranged in sets transversely of the buses and mounted on common channel supports 3, but individual channel supports 3' are provided when the buses or tubular conductors are of different length, as shown as the left of Figures 14 and 15.

As previously noted, and as indicated by the legends "Fixed" and "Slidable," respectively, each conductor 1 is rigidly secured to one of its supporting insulators and is slidably supported on its other insulator or insulators by clamps as illustrated in Figures 3 and 4, respectively.

The conductors 1T at the right end of the bus section I aline with the conductors 1 of bus section III and have stubs or short T-sections which aline with the conductors 1 of bus section II. Expansion joints or flexible electrical connections, as indicated by the legends "Flexible" are provided between the conductors 1T of section I and the conductor 1 of bus sections II and III, respectively. Housing sections 8T of short T-form enclose the T-connections of the bus systems I, II and III.

At the left of Figures 14 and 15 the conductors of bus section I change direction to aline in a plane normal to a plane through the several conductors 1T and passing through the axis of the upper conductor 1T of Figure 14. The tubular conductors 1L at this portion of the bus system include sections bent at right angles to each other, and the enclosing tubular housing sections 8L are of similar angle shape. In the case of relatively short housing sections 8L, as provided for the central conductor 1L in Figure 14, they may be joined by relatively narrow clamping half-rings, as indicated by cover plate 9', which are not associated with a supporting insulator.

Figures 16, 17:
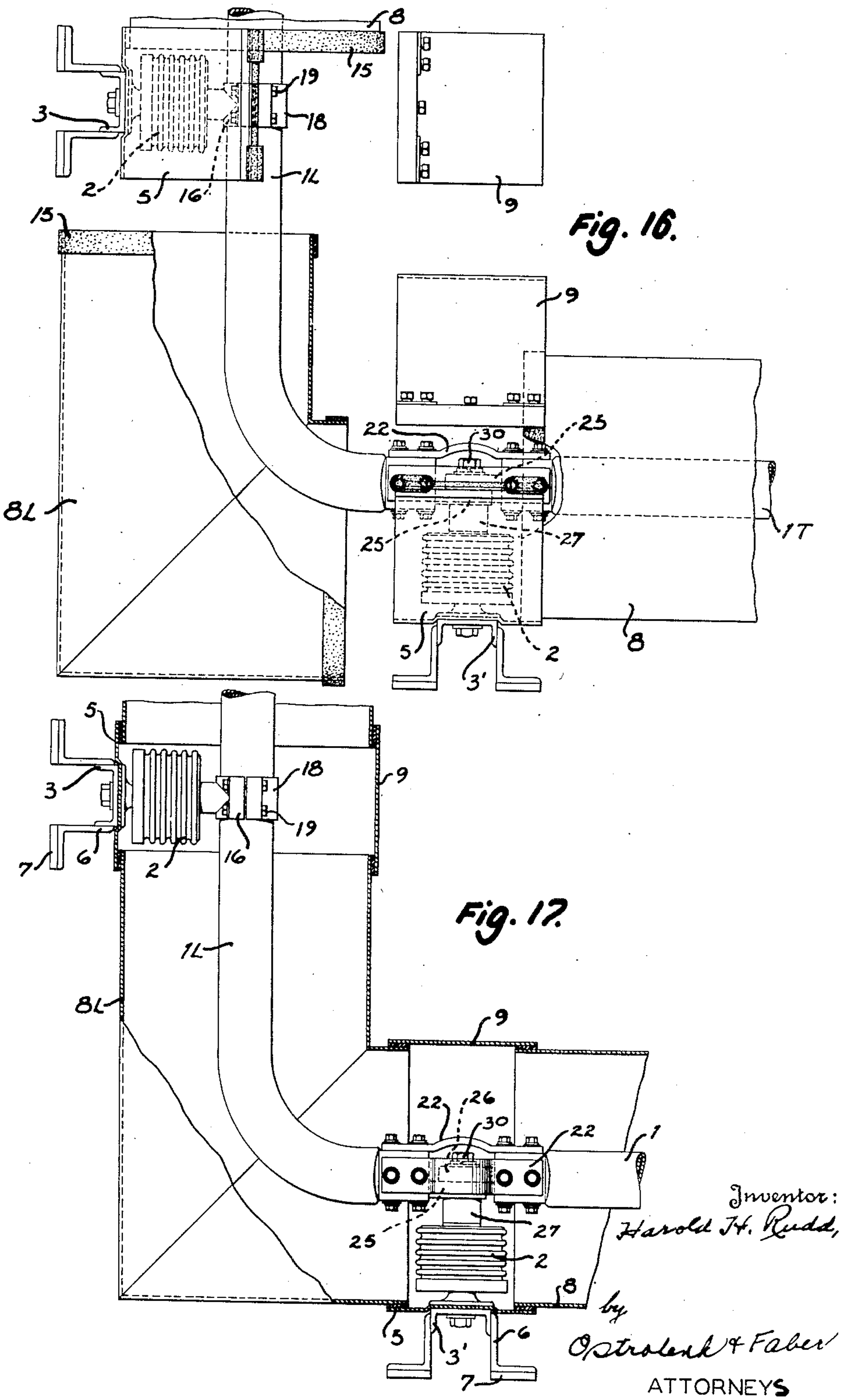
Figure 16 is a fragmentary exploded view to illustrate the method of erecting or assembling the bus system and Figure 17 is a fragmentary side elevation, with parts in section, of the completely assembled bus, supporting structure and housing elements of Figure 16.

The method of installing a bus system embodying the invention is shown in Figure 16, it being assumed that the construction is progressing from right to left. With the conductor 1 rigidly mounted upon an insulator to the right of the illustrated parts and the housing 8 threaded upon the left end of the conductor 1, the insulator supports of Figure 16 (each comprising an insulator 2 and half-ring 5 on a channel 3') are secured to the supporting structure. The angle housing section 8L is slipped over the lower end of the angular conductor 1L, the conductor 1L is brought approximately into position to seat the slotted extension 25 at its lower end upon the metal bushing 27 beneath the slotted extension 26 of the bus section 1, and the conductor 1L is then turned counterclockwise into engagement with the clamping sleeve 18 of the upper insulator 2. Conductor 1L is then loosely clamped to the upper insulator 2 by applying a cover sleeve 18 for a sliding support as shown in Figure 4 and tightening the clamp screws 19.

Assuming that an expansion joint is desired, a spacing sleeve 28 is slipped over the bolt 30 before it is passed through the extensions 25, 26 of bus sections 1L, 1, respectively, and threaded into the lower insulator 2. The connector straps 22 are then bolted to the ends of the bus sections.

This completes the electrical and mechanical connections of the bus sections 1 and 1L, and the housing section 8L may now be lifted into position to seat upon the half-rings 5, and the cover plate 9 of the lower insulator support may be clamped in place.

A further housing section 8 is then threaded upon the upper end of the conductor 1L, if not already in position there, and the progressive mounting of the insulator units on the supporting wall and the clamping thereto of bus sections with housing sections threaded thereon is continued until the enclosed bus system is completed.

In view of the progressive assembly of both the bus and the housing sections upon the insulator half-ring units, as distinguished from the bus system of my prior patent in which the entire bus could be installed before any housing sections were applied, it is, of course, preferable that the non-linear bus sections be of such size and shape that the housing sections can be slipped or threaded over the bus sections. This design condition presents no difficulty even in the case of T-sections of bus, as shown at the right of Figure 15, since the stem of the T-section may be relatively short although one or both sections of the head of the T-section may be quite long.

It is also possible, of course, to provide housing sections of T-, L- or cross form on or about correspondingly shaped bus junctions by assembling the components of the housing about the bus junction and welding the components to each other to form the housing of desired configuration.

While the housing sections have heretofore been described as of circular cross-section and the support plate and clamping ring as arcuate, it is not necessary to have a casting conforming to the roundness of the housing to support it. It is also possible to form the housing in a square, rectangular, diamond or other cross-section.

Figure 18:
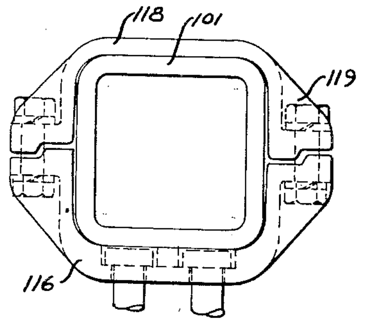
Figure 18 is a cross-sectional view of a bus clamp corresponding to the structure of Figures 3 and 4 but adapted to a square bus.

In Figure 18 I have shown a bus 101 of square cross-section with rounded corners supported by clamping plate 116 of half square cross-section and upper sleeve 118 connected by bolts 119. The edges of sleeves 116 and 118 may be stepped as described in connection with Figures 3 and 4 so that with one arrangement a rigid clamp is secured and reversal of member 118 results in a sliding support for the bus 101.

Thus, the invention is adapted to square as well as round buses.

Figure 20:
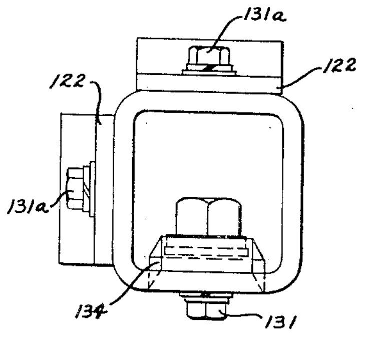
Figures 19 and 20 are views of a coupling corresponding, respectively to the coupling of Figures 10 and 11.
Figure 19:
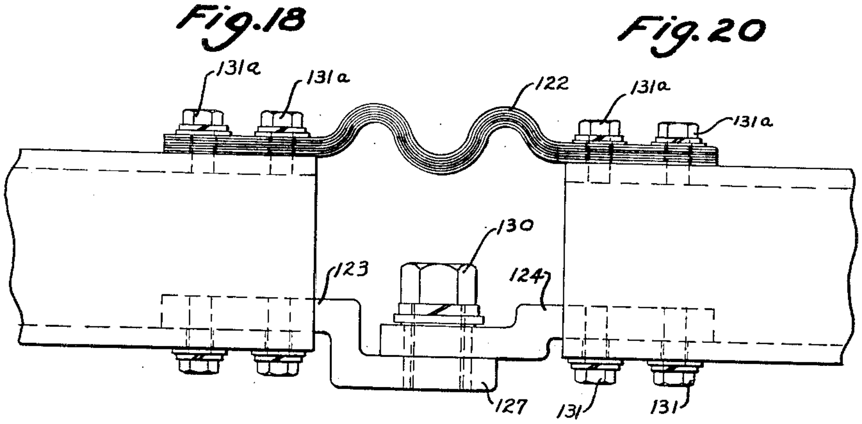

In Figures 19 and 20 a straight expansion coupling of the general type of Figures 10 and 11 is shown wherein, however, instead of plugs 23 and 24 being required simple extensions 123 and 124 are secured by bolts 131 to adjacent ends of the buses and secured together by bolt 130 in bushing 127 connected to the insulator. Oversize openings in the ends of extensions 123 and 124 serve to provide a sliding securement. Current is carried between the buses by jumpers 122 secured thereto by bolts 131*a*.

In Figures 21, 22, and 23, I have shown various ways in which the elements of Figures 1 to 20 may be used in combination in a single bus run. Each shipping assembly may thus consist of a length of conductor with associated insulators and housings which may be readily assembled as required by the user.

It is to be understood that the invention is not limited to the particular constructions herein illustrated and described since various modifications which may occur to those familiar with the design and construction of bus systems fall within the spirit and scope of the invention as recited in the following claims.

I claim:

1. In an isolated enclosed bus system, a supporting unit comprising a single insulator, a base for supporting said insulator, means at one end of said insulator for supporting said bus, a pair of first metallic members for encircling the bus, and a second member comprising a metallic sheet-like material conforming to a portion of adjacent first members and forming a seat to connect said two adjacent first members and to retain said first members in position about said bus, said second member having a portion clamped between said insulator and supporting base, and said first members together with said second member housing said bus.

2. In an isolated enclosed bus system, a supporting unit comprising a single insulator, a base for supporting said insulator, means at one end of said insulator for supporting said bus, metallic tubular housing sections for enclosing the bus, and retaining means comprising a metallic strap of sheetlike material conforming to a portion of the outer shape of the housing sections, and secured to said base for forming a seat and a connection for two adjacent housing sections, the strap being clamped between said insulator and said base and having a flat section at the area of clamping.

3. In an isolated, enclosed bus system, a supporting unit comprising a single insulator, a base for supporting said insulator, means at one end of said insulator for supporting a bus, metallic tubular housing sections for enclosing the bus and retaining means comprising a semi-cylindrical metallic strap of sheetlike material conforming to a portion of the shape and external of the housing sections and being secured to said base and supporting the adjoining ends of said housing sections, and gasket means for hermetically sealing the ends of said housing sections, said housing sections extending between and terminating within said metallic strap with said gasket means intermediate said strap and the supported ends of said housing sections.

4. In an isolated, enclosed bus system, a supporting unit comprising a single insulator, a base for supporting said insulator, means at one end of said insulator for supporting a bus, metallic tubular housing sections for enclosing the bus and retaining means comprising a semi-cylindrical metallic strap of sheetlike material conforming to a portion of the shape and external of the housing sections and being secured to said base and supporting the adjoining ends of said housing sections, and gasket means for hermetically sealing the ends of said housing sections, said housing sections extending between and terminating within said metallic strap with said gasket means intermediate said sheet and the supported ends of said housing sections, wherein said supporting means at the other end of said insulator comprises an inner semi-cylindrical sleeve with stepped edges non-symmetrical with respect to the axis thereof, and an outer semicylindrical clamping sleeve with stepped edges non-symmetrical with respect to the axis thereof, whereby the effective internal diameter of the opening between said clamping sleeves depends upon the relative arrangement of the outer clamping sleeve with respect to the inner clamping sleeve.

5. In an isolated enclosed bus system, a supporting unit comprising a single insulator, a base for supporting said insulator, means at one end of said insulator for supporting said bus, metallic tubular housing sections for enclosing the bus, and retaining means comprising a metallic strap of sheetlike material conforming to a portion of the outer shape of the housing sections, and secured to said base for forming a seat and a connection for two adjacent housing sections, the strap being clamped between said insulator and said base and having a flat section at the area of clamping, wherein said supporting means at the other end of said insulator comprises an inner semi-cylindrical sleeve with stepped edges non-symmetrical with respect to the axis thereof, and an outer semi-cylindrical clamping sleeve with stepped edges non-symmetrical with respect to the axis thereof, whereby the effective internal diameter of the opening between said clamping sleeves depends upon the relative arrangment of the outer clamping sleeve with respect to the inner clamping sleeve.

6. In an isolated, enclosed bus system, a supporting unit comprising a single insulator, a base for supporting said insulator, means at one end of said insulator for supporting a bus comprising mating semi-cylindrical sleeves with meeting edges having steps non-symmetrical with respect to the axes thereof, whereby the effective internal diameter of the opening of said clamping sleeves depends on the relative arrangement of the meeting edges thereof.

(References on following page)

References Cited in the file of this patent

UNITED STATES PATENTS

| | | |
|---|---|---|
| 1,966,132 | Pearson | July 10, 1934 |
| 1,979,099 | Cornell | Oct. 30, 1934 |
| 2,044,679 | Frese | June 16, 1936 |
| 2,094,258 | Thompson | Sept. 28, 1937 |
| 2,181,664 | Melzer | Nov. 28, 1939 |
| 2,229,006 | Rudd | Jan. 14, 1941 |
| 2,335,543 | Rudd | Nov. 30, 1943 |
| 2,469,445 | Scott | May 10, 1949 |